(12) United States Patent
Ago et al.

(10) Patent No.: US 8,321,051 B2
(45) Date of Patent: Nov. 27, 2012

(54) WORKPIECE PICKUP APPARATUS AND WORKPIECE PICKUP METHOD

(75) Inventors: Shinji Ago, Tochigi (JP); Yoshiaki Nakagawa, Tochigi (JP)

(73) Assignee: Honda Motor Co., Ltd., Tokyo (JP)

( * ) Notice: Subject to any disclaimer, the term of this patent is extended or adjusted under 35 U.S.C. 154(b) by 220 days.

(21) Appl. No.: 12/715,859

(22) Filed: Mar. 2, 2010

(65) Prior Publication Data

US 2010/0228388 A1 Sep. 9, 2010

(30) Foreign Application Priority Data

Mar. 3, 2009 (JP) ................................. 2009-049637
Mar. 10, 2009 (JP) ................................. 2009-056508

(51) Int. Cl.
*B65G 47/91* (2006.01)

(52) U.S. Cl. .......... 700/228; 414/626; 414/797; 294/65; 294/186

(58) Field of Classification Search ........... 700/228–230
See application file for complete search history.

(56) References Cited

U.S. PATENT DOCUMENTS

| | | | | |
|---|---|---|---|---|
| 3,884,363 A | * | 5/1975 | Ajlouny | 414/626 |
| 4,252,497 A | * | 2/1981 | Burt | 414/627 |
| 5,188,411 A | * | 2/1993 | Golden | 294/64.2 |
| 5,755,550 A | * | 5/1998 | Brandt et al. | 414/797 |
| 5,839,877 A | * | 11/1998 | Kikuchi et al. | 414/797 |
| 6,166,646 A | * | 12/2000 | Park et al. | 340/626 |
| 7,543,868 B1 | * | 6/2009 | Mongan | 294/186 |
| 2001/0045755 A1 | * | 11/2001 | Schick et al. | 294/65 |
| 2003/0032365 A1 | * | 2/2003 | Tokutake et al. | 451/5 |
| 2004/0130085 A1 | * | 7/2004 | Lim | 269/58 |
| 2006/0108960 A1 | * | 5/2006 | Tanaka et al. | 318/568.21 |

FOREIGN PATENT DOCUMENTS

JP 04-274832 9/1992

* cited by examiner

*Primary Examiner* — Gene Crawford
*Assistant Examiner* — Kyle Logan
(74) *Attorney, Agent, or Firm* — Rankin, Hill & Clark LLP

(57) ABSTRACT

A workpiece pickup apparatus is provided. The workpiece pickup apparatus includes: a gripping unit which sucks a workpiece so as to lift up the workpiece; a lowering unit which lowers the gripping unit from a waiting position towards the workpiece; a detecting unit which detects a physical amount which corresponds to a force with which the gripping unit presses the workpiece; a comparison unit which compares the detected physical amount with a reference physical amount; and a controller which controls a movement of the gripping unit based on a comparison result of the detected physical amount and the reference physical amount.

4 Claims, 17 Drawing Sheets

WORKPIECE PICKUP APPARATUS AND WORKPIECE PICKUP METHOD

This application claims priority from Japanese Patent Application No. 2009-049637, filed on Mar. 3, 2009, and Japanese Patent Application No. 2009-056508, filed on Mar. 10, 2009, the entire contents of which are hereby incorporated by reference.

FIELD OF THE INVENTION

The present invention relates to a workpiece pickup apparatus and method for lifting up a workpiece by causing a gripping means to suck the workpiece.

DESCRIPTION OF RELATED ART

JP-A-4-274832 discloses a workpiece pickup apparatus in which a vacuum cup is raised or lowered by a servo mechanism and a raising or lowering speed of the vacuum cup is switched from a high speed to a low speed before the vacuum cup reaches a workpiece.

According to JP-A-4-274832, there is a likelihood that the position of a workpiece is changed by a change in position of a table on which the workpiece is put, and hence, a distance detector for detecting the displacement of a workpiece is attached to a drive shaft of the vacuum cup.

In addition, according to JP-A-4-274832, since sizes of workpieces are not taken into consideration, the number of vacuum cups has no significance, and a workpiece is picked up by one vacuum cup.

However, since the distance detector of JP-A-4-274832 is expensive and easy to fail, the distance detector is not suitable for mass production of workpiece pickup apparatuses. In addition, since the workpiece and the table are deflected due to suck by the vacuum cap when the vacuum cup contacts the workpiece, in the event that sucking by the vacuum cup is controlled based on distance (position), the workpiece cannot be sucked properly due to excessive or insufficient pressing.

In JP-A-4-274832, when the size of workpieces is large, it is necessary to install a plurality of vacuum cups, and there is a case in which the plurality of vacuum cups are raised at different timings to prevent a double blank. In the specification "double blank" means a pickup of two workpieces at one time.

In the case of lowering the plurality of vacuum cap altogether at one time and casing the vacuum caps to suck a workpiece simultaneously after having waited for a completion of transfer of the workpiece by a transfer means, it is necessary to raise a vacuum cup that is to be raised last after having waited for raising the other vacuum cups that are to be raised beforehand. This produces a wasteful waiting time to be spent by the vacuum cup to be raised last, resulting in a long cycle time.

SUMMARY OF INVENTION

Illustrative aspects of the present invention provide a workpiece pickup apparatus and a work piece pickup method which allow gripping means to suck a workpiece appropriately, and which can reduce a cycle time of transferring the workpiece.

According to a first aspect of the invention, a workpiece pickup apparatus includes: a gripping unit which sucks a workpiece so as to lift up the workpiece; a lowering unit which lowers the gripping unit from a waiting position towards the workpiece; a detecting unit which detects a physical amount which corresponds to a force with which the gripping unit presses the workpiece; a comparison unit which compares the detected physical amount with a reference physical amount; and a controller which controls a movement of the gripping unit based on a comparison result of the detected physical amount and the reference physical amount.

Other aspects and advantages of the invention will be apparent from the following description, the drawings and the claims.

DETAILED DESCRIPTION OF EXEMPLARY EMBODIMENTS

Hereinafter, exemplary embodiments of the invention will be described by reference to FIGS. 1 to 17.

[First Exemplary Embodiment]

Figure 1:
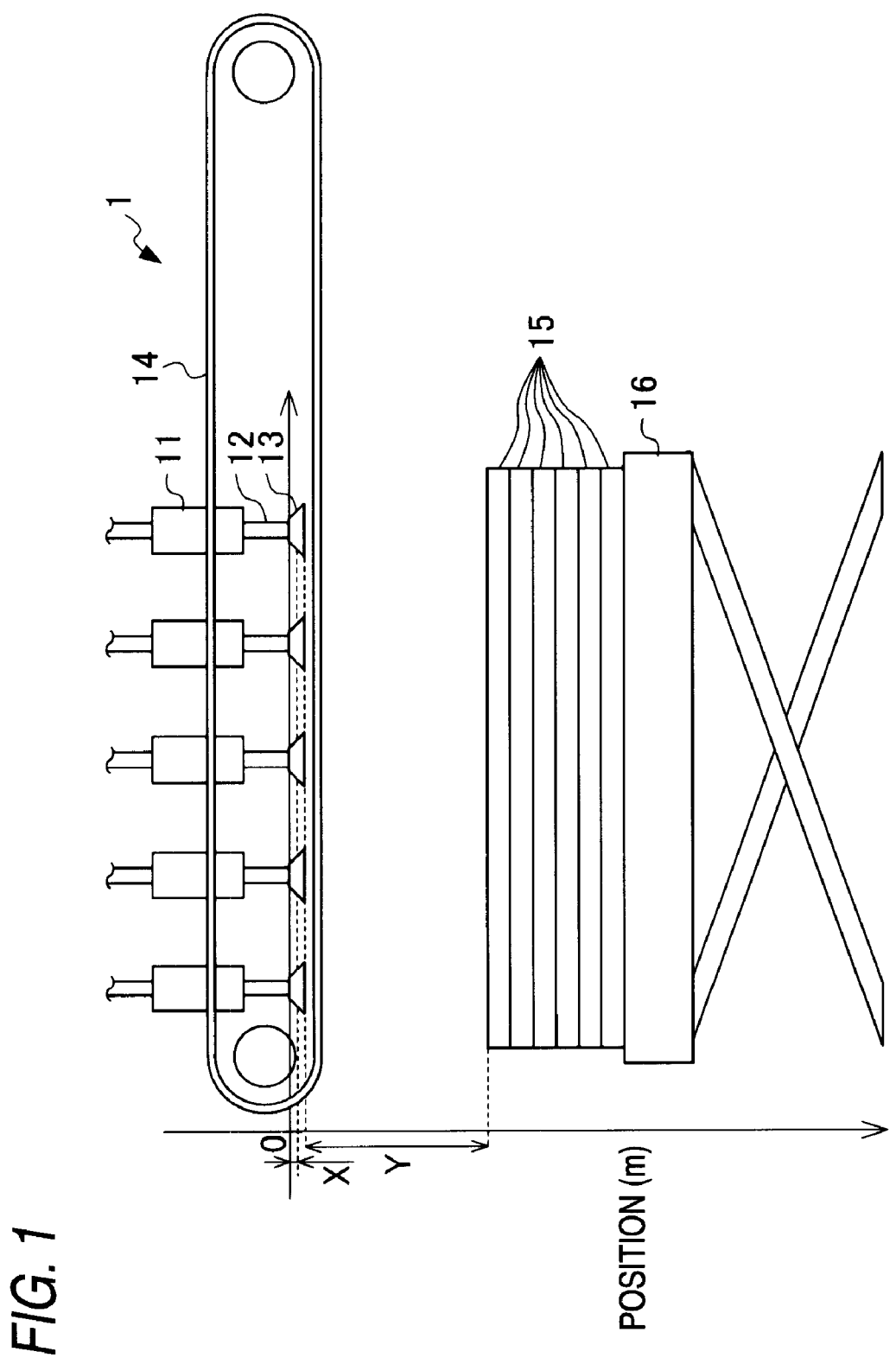
FIG. 1 is a side view of a workpiece pickup apparatus according to a first exemplary embodiment of the invention.

FIG. 1 is a side view of a workpiece pickup apparatus 1 according to a first exemplary embodiment of the invention.

A workpiece pickup apparatus 1 includes servo cylinders 11, support shafts 12, vacuum cups 13, a MGT (magnet) belt 14 and a controller (not shown). The support shafts 12 are members for supporting the vacuum cups 13. In addition, the support shafts 12 are connected to the servo cylinders 11.

A plurality of workpieces 15 and a table 16 for putting the workpieces 15 thereon are disposed at a lower portion of the workpiece pickup apparatus 1. The plurality of workpieces 15 are disposed with slight gaps between the workpieces 15 by a magnet floater (not shown). These gaps are provided to prevent the occurrence of double blank (picking up two workpieces at one time.

In FIG. 1, a state is shown in which the servo cylinders 11 stay at a waiting position, and when the servo cylinders 11 stay at the waiting position, lower end portions of the shafts 12 are situated in a position denoted by "0" on coordinates. X shown on the coordinates in FIG. 1 represents a pushed-in amount of the vacuum cup 13 by the support shaft 12 (a deflection margin of the workpiece 15), and Y represents a distance from a lower end of the vacuum cup 13 to a topmost workpiece 15. In addition, as will be described later in FIG. 6, a current control is implemented after the vacuum cups 13 have been lowered by the distance Y to be brought into contact with the workpiece 15 and further, the support shafts 12 have been lowered by X together with the servo cylinders 11.

In the workpiece pickup apparatus 1, the workpiece 15 is brought into contact with the MGT belt 14 by lifting the workpiece 15 upwards by the vacuum cups 13, and then, by driving the MGT belt 14, the workpiece 15 is transferred. Since the MGT belt 14 is magnetized, the MGT belt 14 magnetically attracts to the workpiece 15 by means of a magnetic force.

Figure 2:
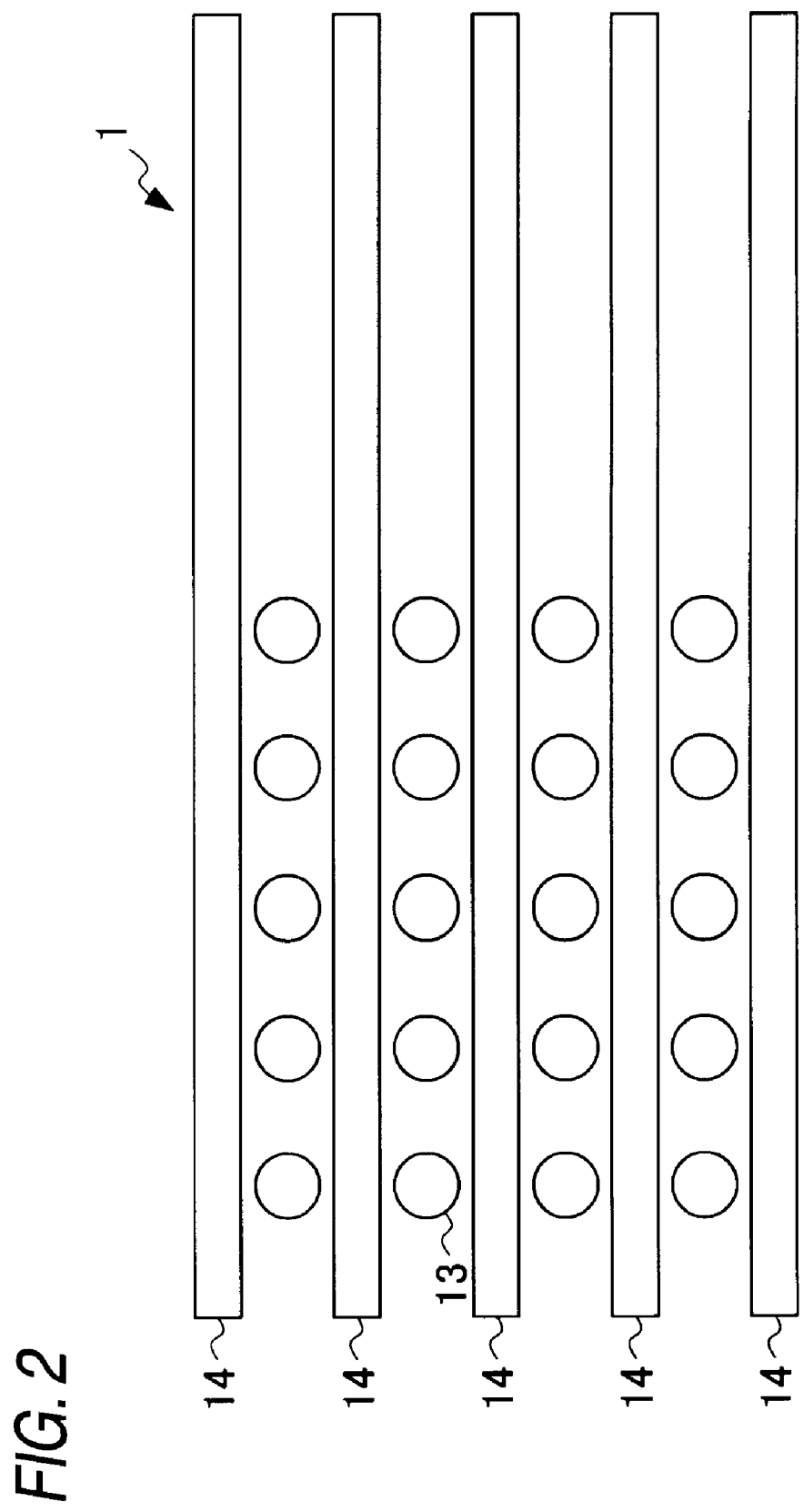
FIG. 2 is a plan view of the workpiece pickup apparatus according to the first exemplary embodiment.

FIG. 2 is a plan view of the workpiece pickup apparatus 1 according to the first exemplary embodiment.

FIG. 2 is the plan view of the workpiece pickup apparatus 1 as viewed from above, which shows a plurality of vacuum cups 13 are disposed individually between a plurality of (five according to the exemplary embodiment) MGT belts 14. According to the first exemplary embodiment, the number of vacuum cups 13 that are disposed between any two adjacent MGT belts 14 is five. In FIG. 2, the servo cylinders 11, the support shafts 12, the workpieces 15 and the table 16 are omitted.

Figure 3:
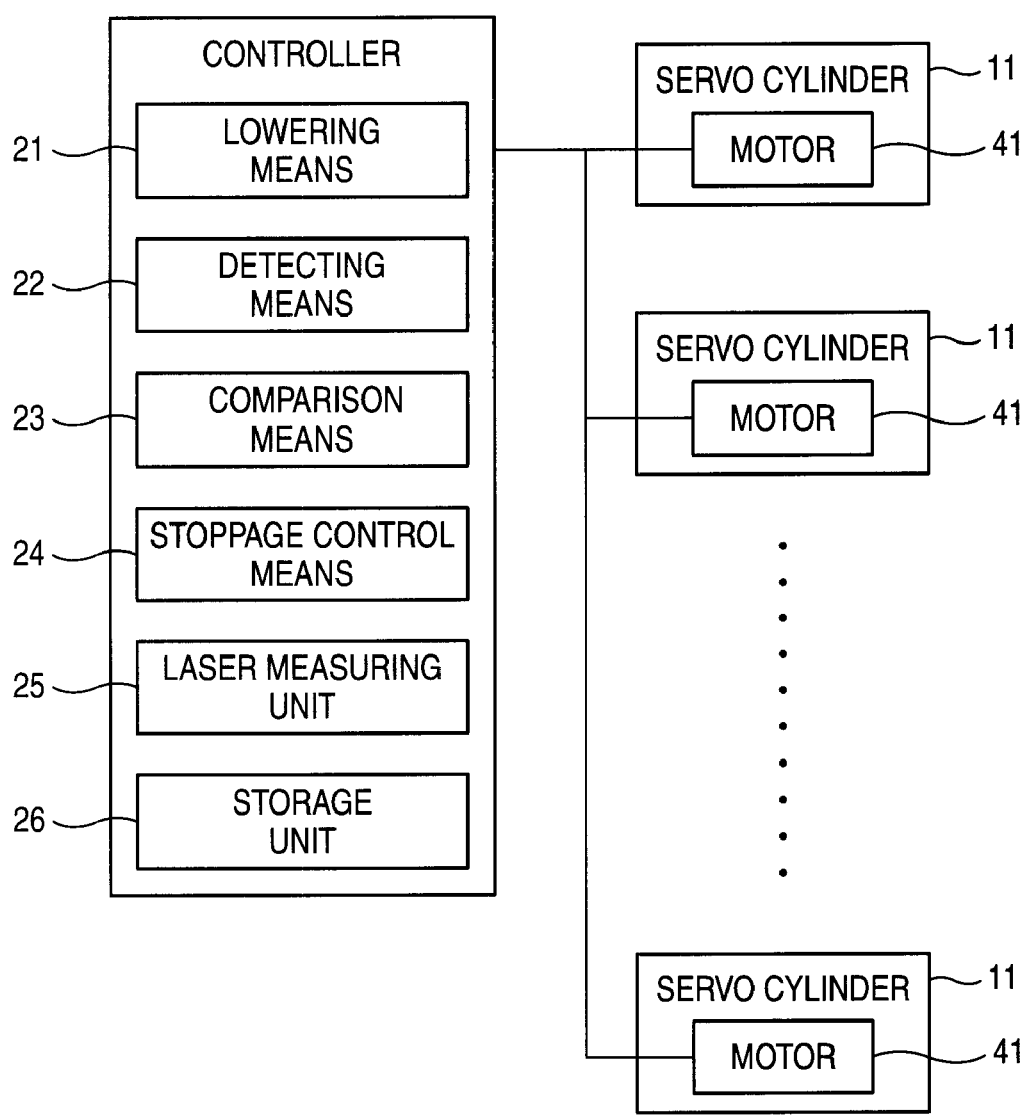
FIG. 3 is a block diagram showing a relationship between a controller and servo cylinders which are provided in the workpiece pickup apparatus according to the first exemplary embodiment.

FIG. 3 is a block diagram showing a relationship between the controller and the servo cylinders 11 which are provided in the workpiece pickup apparatus 1.

Each of servo cylinders 11 has a motor 41 and is electrically connected with the controller via the motor 41. The motor 41 receives a drive control signal from the controller to position the corresponding servo cylinder 11 in various locations or lower, raise and stop the servo cylinder 11. The corresponding support shaft 12 and vacuum cup 13 follow the various movements of the servo cylinder 11, for example, the support shaft 12 and vacuum cap 13 are lowered as the corresponding servo cylinder 11 is lowered.

The controller includes a lowering means (lowering unit) 21, a detecting means (detecting unit) 22, a comparison means (comparison unit) 23, a stoppage control means (stoppage control unit) 24, a laser measuring unit 25 and a storage unit 26.

The lowering means 21 transmits, to the motors 41, a drive control signal to lower the servo cylinders 11. The detecting means 22 detects a physical amount corresponding to a force with which the vacuum cup 13 presses the workpiece 15 (in the first exemplary embodiment, a current value of a current which flows to each servo cylinder 11).

The comparison means 23 compares the current value detected by the detecting means 22 and a reference current value. The reference current value is stored in advance in the storage unit 26. The stoppage control means 24 controls the servo cylinder 11 based on the result of the comparison carried out by the comparison means 23 to lower or stop the servo cylinder 11.

The laser measuring unit 25 measures a distance from a lower end of the vacuum cup 13 to the topmost workpiece 15. The result of the measurement is stored in the storage unit 26 as a distance "Y." Note that the pushed-in amount "X" of the vacuum cups 13 by the support shafts 12 is stored in advance in the storage unit 26.

Figure 4:
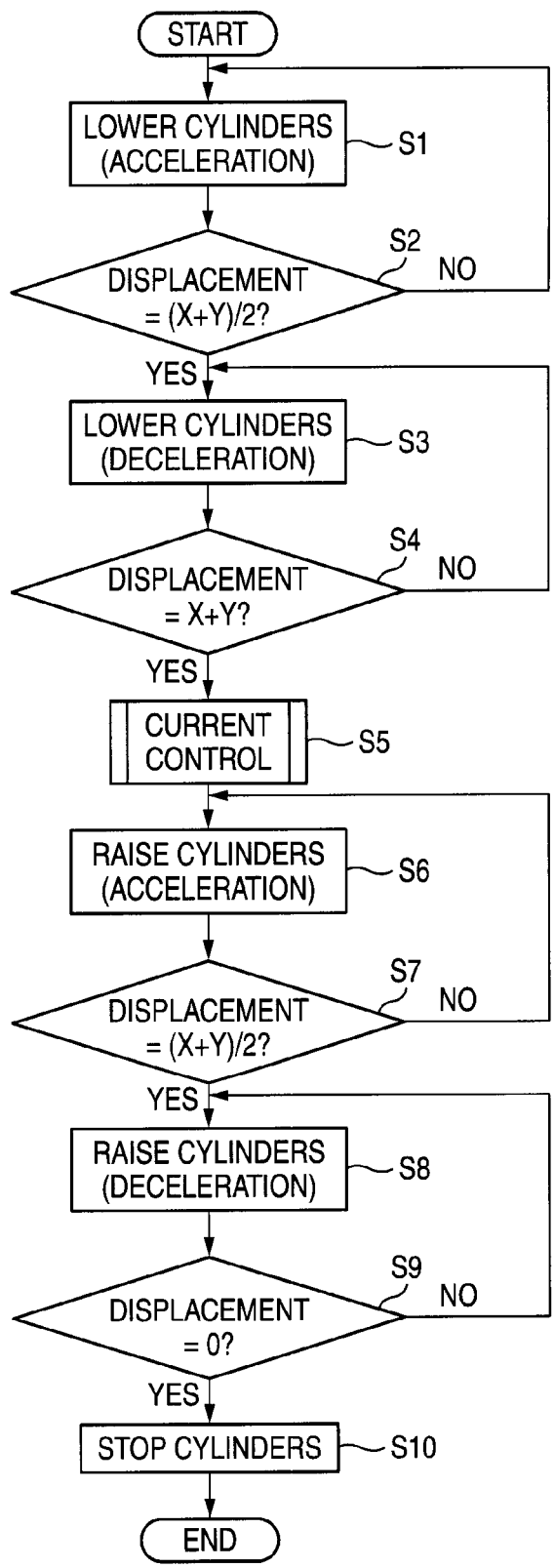
FIG. 4 is a flow chart showing operations carried out by the controller in lowering or raising the servo cylinders.

FIG. 4 is a flow chart showing operations to lower the servo cylinders 11 by the controller.

In step S1, the servo cylinders 11 are lowered while being accelerated. As the servo cylinders 11 are lowered, the support shafts 12 and the vacuum cups 13 are also lowered. In this time, the lowering speed is increased with constant acceleration. In step S2, it is determined whether or not a displacement of the support shafts 12 from a waiting position is (X+Y)/2. In the case of YES, an operation in step S3 is performed, while in the case of NO, the operation in step S1 is performed.

In step S3, the servo cylinders 11 are lowered while being decelerated. In this time, the lowering speed is reduced at constant acceleration. In step S4, it is determined whether or not the displacement of the support shafts 12 from the waiting position is X+Y. In the case of YES, an operation in step S5 is performed, while in the case of NO, the operation in step S3 is performed.

Figure 6:
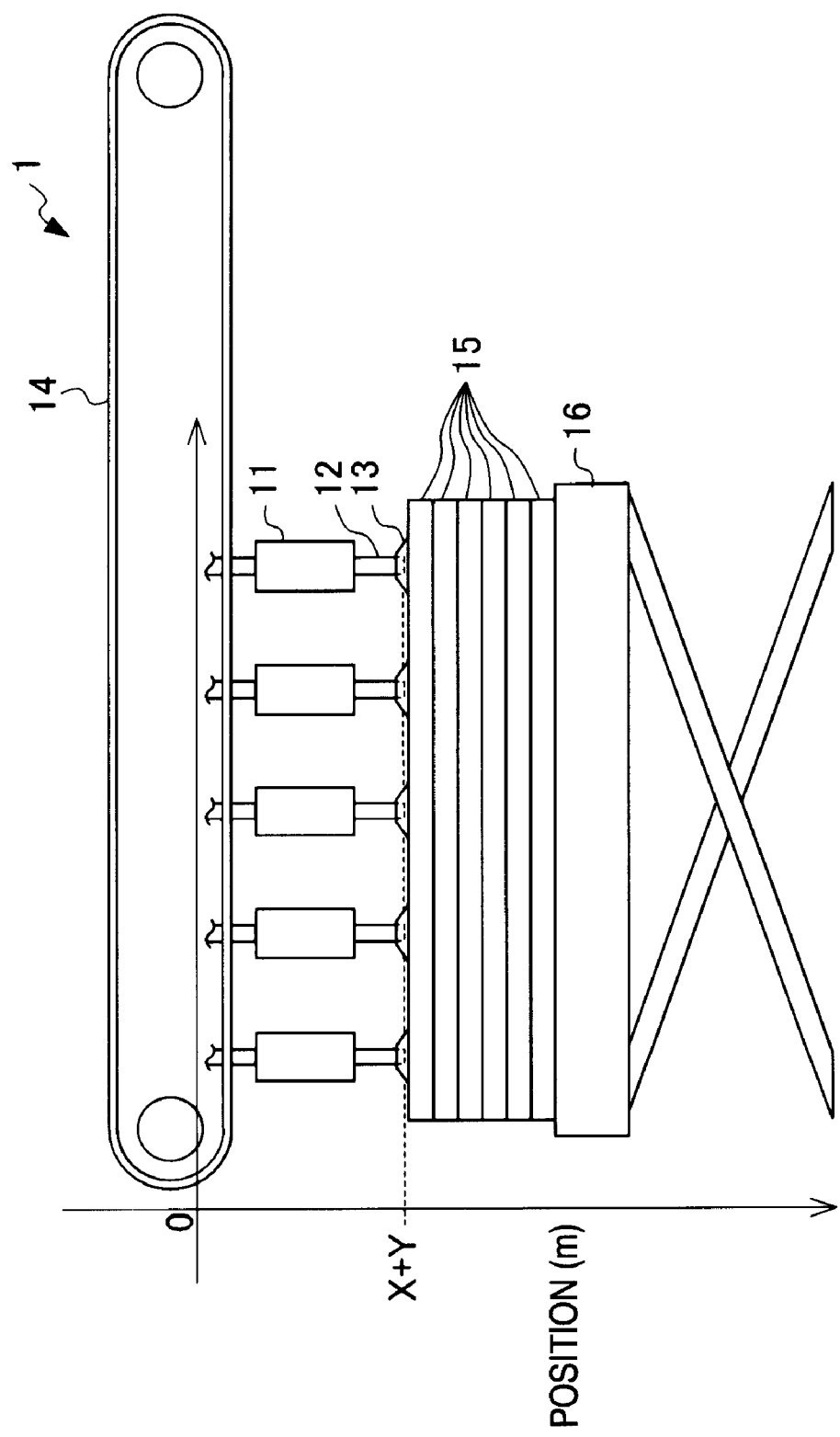
FIG. 6 is a diagram showing a state in which a displacement of support shafts from a waiting position is X+Y.

Referring to FIG. 6, a condition will be described in which the displacement of the support shafts 12 from the waiting position is X+Y.

FIG. 6 shows a condition in which the support shafts 12 are lowered further by X after the vacuum cups 13 have made contact with the topmost workpiece 15 to push the vacuum cups 13 by the pushed-in amount X (the margin of deflection of the workpiece 15) into the workpiece 15. If a current control is made to be started from the contact of the vacuum cups 13 with the topmost workpiece 15 (after the displacement of the support shafts 12 from the waiting position has become Y), the current control is also performed when the support shafts 12 are lowered by the margin X of deflection of the workpiece 15. However, during the support shafts 12 are lowered by the margin X of deflection of the workpiece 15, the suction by the vacuum cups 13 is weak, and hence, the workpiece 15 cannot be lifted up. Thus, if the current control is also performed when the support shafts 12 are lowered by the margin X, an operation efficiency of picking up the workpieces 15 is down. Therefore, in the exemplary embodiment, the controller starts a current control after pushing the vacuum cap 13 by the pushed-in amount X so that the operation efficiency is maintained.

Figure 5:
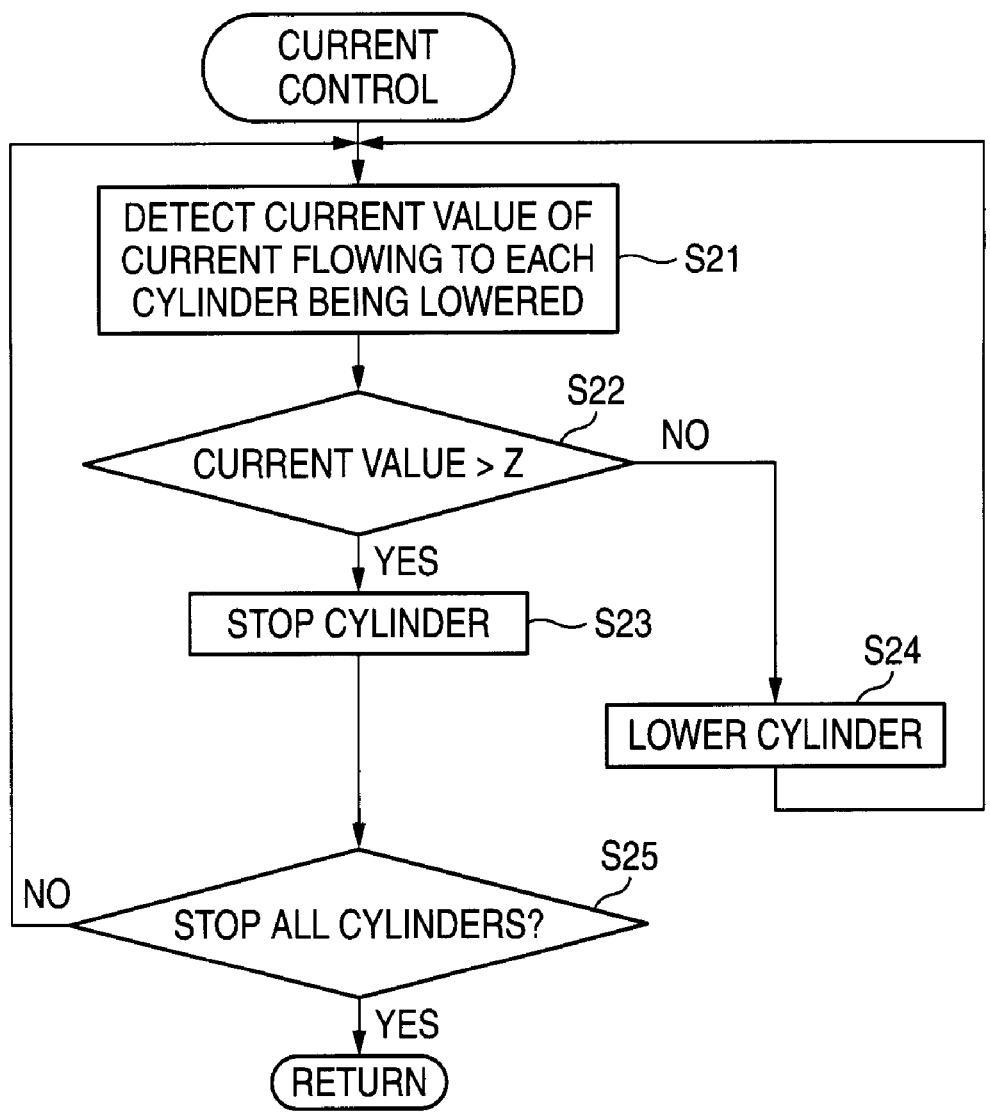
FIG. 5 is a flow chart showing operations carried out by the controller in controlling current.

FIG. 5 is a flow chart showing current control operations carried out by the controller. Referring to FIG. 5, operations of a subroutine for the current control will be described.

In step S21, current values of the current flowing to the servo cylinders 11 which are being lowered are detected respectively. In step S22, it is determined whether or not each of the detected current values is larger than Z (a reference current value). In the case of YES, an operation in step S23 is performed, while in the case of NO, an operation in step S24 is performed.

The detected current values are such as to correspond to pressing forces with which the vacuum cups 13 press the workpiece 15, the larger the current values, the larger the pressing forces. The reference current value Z is a value which corresponds to an optimum pressing force for the vacuum cups 13. If the current values are smaller than the reference current value Z, the pressing forces of the vacuum cups 13 are weak, and a suction force is not generated which is good enough to lift up the workpiece 15. On the other hand, if the current values are larger than Z, the pressing forces of the vacuum cups 13 become so strong that the gaps between the topmost workpiece 15 and the second topmost workpiece 15 are eliminated, whereby the double blank is likely to occur. In addition, there is a likelihood of stoppage of the servo cylinders due to servo errors.

In step S23, the servo cylinder or cylinders 11 whose current values surpass the reference current value Z are stopped, and the flow of subroutine operation proceeds to an operation in step S25. In step S24, the servo cylinder or cylinders whose current values are equal to or less than the current reference value Z are lowered, and the flow of subroutine operation proceeds to step S21.

In step S25, it is determined whether or not all the servo cylinders 11 are stopped. In the case of YES, the current control subroutine operation ends and an operation in step S6 in FIG. 4 is performed, while in the case of NO, the operation in step S21 is performed. When all the servo cylinders 11 are stopped in step S25, the topmost workpiece 15 is suitably sucked by all the servo cylinders 11 with the optimum pressing force.

The optimum pressing force exerted on the workpiece 15 by the vacuum cups 13 can be obtained through the above current control subroutine operation, thereby it is possible to prevent the occurrence of the double blank.

Returning to FIG. 4, in step S6, the servo cylinders 11 sucking the workpiece 15 are raised while being accelerated. In this time, a raising speed of the servo cylinders 11 is increased at constant acceleration. In step S7, it is determined whether or not the displacement of the support shafts 12 from the waiting position is (X+Y)/2. In the case of YES, an operation in step S8 is performed. In the case of NO, the operation in step S6 is performed.

Figure 7:
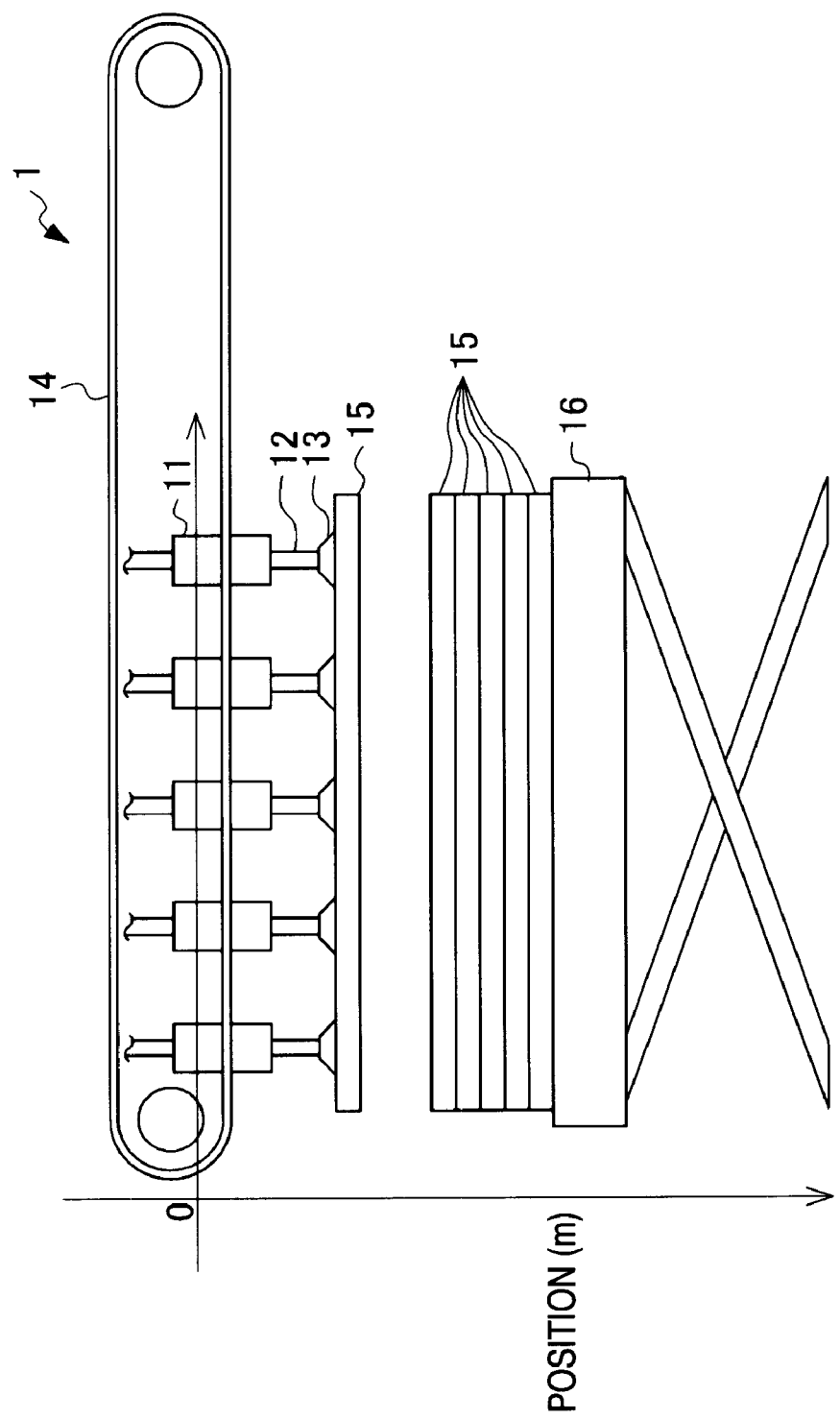
FIG. 7 is a diagram showing the servo cylinders as being raised.

FIG. 7 shows the servo cylinders 11 as being raised. According to FIG. 7, all the plurality of vacuum cups 13 suck the topmost workpiece 15, and only topmost workpiece 15 is being raised thereby.

Returning to FIG. 4, in step S8, the servo cylinders 11 are raised while being decelerated. In this time, the raising speed is reduced at constant acceleration. In step S9, it is determined whether or not the displacement of the support shafts 12 from the waiting position is 0. In the case of YES, an operation in step S10 is performed. In the case of NO, the operation in step S8 is performed.

In step S10, the servo cylinders 11 are stopped and the operation ends.

Figure 8:
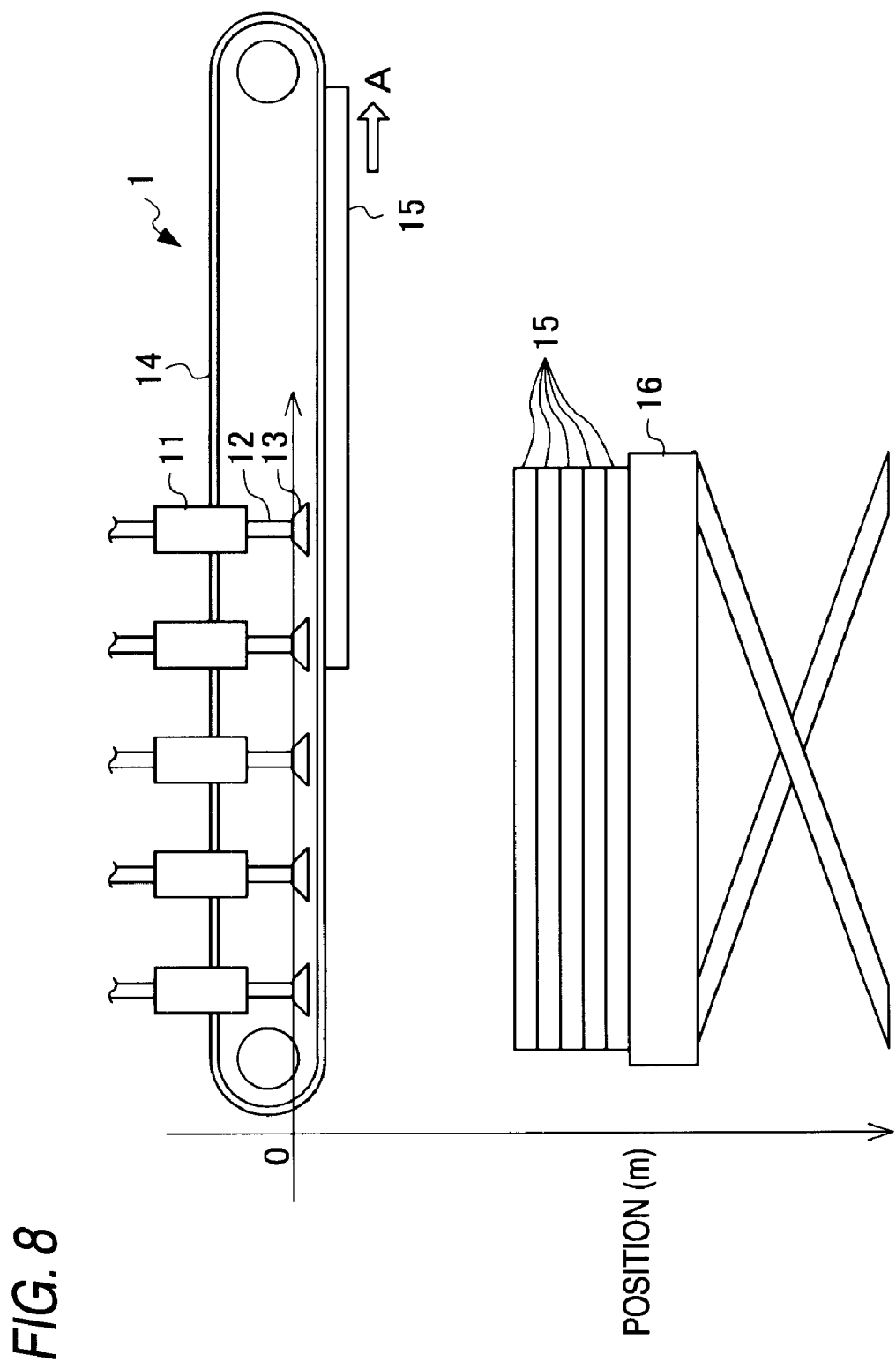
FIG. 8 is a diagram showing the servo cylinders as having returned to the waiting position.

FIG. 8 shows the servo cylinders as having returned to the waiting position. According to FIG. 8, all the plurality of servo cylinders 11 have returned to the waiting position. The workpiece 15 is attracted to the MGT belt 14 and is being transferred in a direction indicated by an arrow A in FIG. 8.

According to the first exemplary embodiment, there are following advantages. (1) In the workpiece pickup apparatus of the first exemplary embodiment, the current values are detected which correspond to the forces with which the vacuum cups 13 press the workpiece 15, the detected current values are compared with the reference current value, and the servo cylinders 11 are controlled to be lowered or stopped based on the result of the comparison. Consequently, in the workpiece pickup apparatus, since the servo cylinders 11 are controlled to be lowered or stopped based on the forces with which the vacuum cups 13 press the workpiece 15 not on a distance between the vacuum cups 13 and the workpiece 15, even if the distance varies, the vacuum cups 13 can suck the workpiece 15 appropriately.

(2) Since the stoppage control means 24 controls the servo cylinders 11 to continue to be lowered until the detected current values reach the reference current value, the workpiece 15 can be prevented from being pressed excessively or insufficiently by the vacuum cups 13 by setting in advance the reference current value, thereby it is possible to suck only the topmost workpiece 15 by the vacuum cups 13 under the appropriate pressure. As a result, the occurrence of the double blank (pickup of two workpieces at one time) can be prevented.

(3) The detecting means 22 detects current values after the servo cylinders 11 have been lowered a given distance. Consequently, since no current detection has to be carried out while the servo cylinders 11 are lowered the given distance from the waiting position, the control operation of the servo cylinders 11 can be improved.

Note that the invention is not limited to the first exemplary embodiment, and modifications and improvements falling within a scope that can attain the object of the invention are to be included in the invention.

[Second Exemplary Embodiment]

Figure 9:
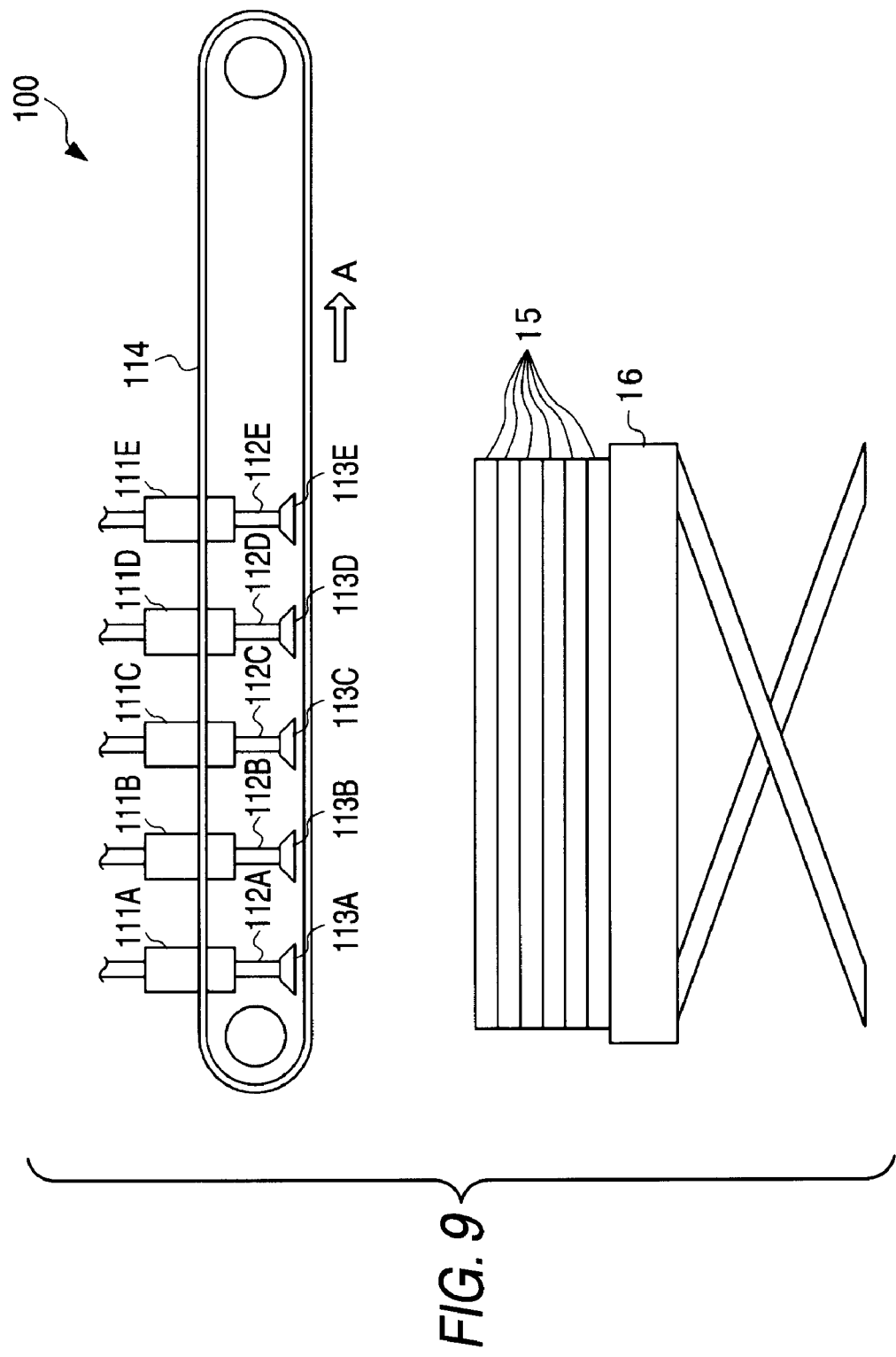
FIG. 9 is a side view of a workpiece pickup apparatus according to a second exemplary embodiment of the invention.

FIG. 9 is a side view of a workpiece pickup apparatus 100 according to a second exemplary embodiment of the invention.

A workpiece pickup apparatus 100 includes sever cylinders 111A to 111E, support shafts 112A to 112E, vacuum cups 113A to 113E, a MGT (magnet) belt 114, a controller (not shown), a plurality of workpieces 15, a table 16 which puts the workpieces 15 thereon and a blower unit (not shown) for blowing air into a gap between the adjacent workpieces 15.

The support shafts 112A to 112E are members for supporting the vacuum cups 113A to 113E. The support shafts 112A to 112E are connected to the servo cylinders 111A to 111E. The plurality of workpieces 15 and the table 16 which supports the workpieces 15 are disposed below the vacuum cups 113A to 113E. FIG. 9 shows the servo cylinders 111A to 111E as staying in a waiting position.

In the workpiece pickup apparatus 100, the workpiece 15 and the MGT belt 114 are brought into contact with each other by controlling the vacuum cups 113A to 113E to suck the workpiece 15 to lift the workpiece 15 upwards, and by driving the MGT belt 114 the workpiece 15 is transferred in a transfer direction A. Since the MGT belt 114 is magnetized, the MGT belt 114 magnetically attracts to the workpiece 15 by means of a magnetic force.

In the second exemplary embodiment, the vacuum cups 113A to 113E are lowered sequentially in the order of 113A, 113B, 113C, 113D and 113E from the vacuum cup 113A which is positioned at an endmost portion in an opposite direction to the transfer direction A.

Figure 10:
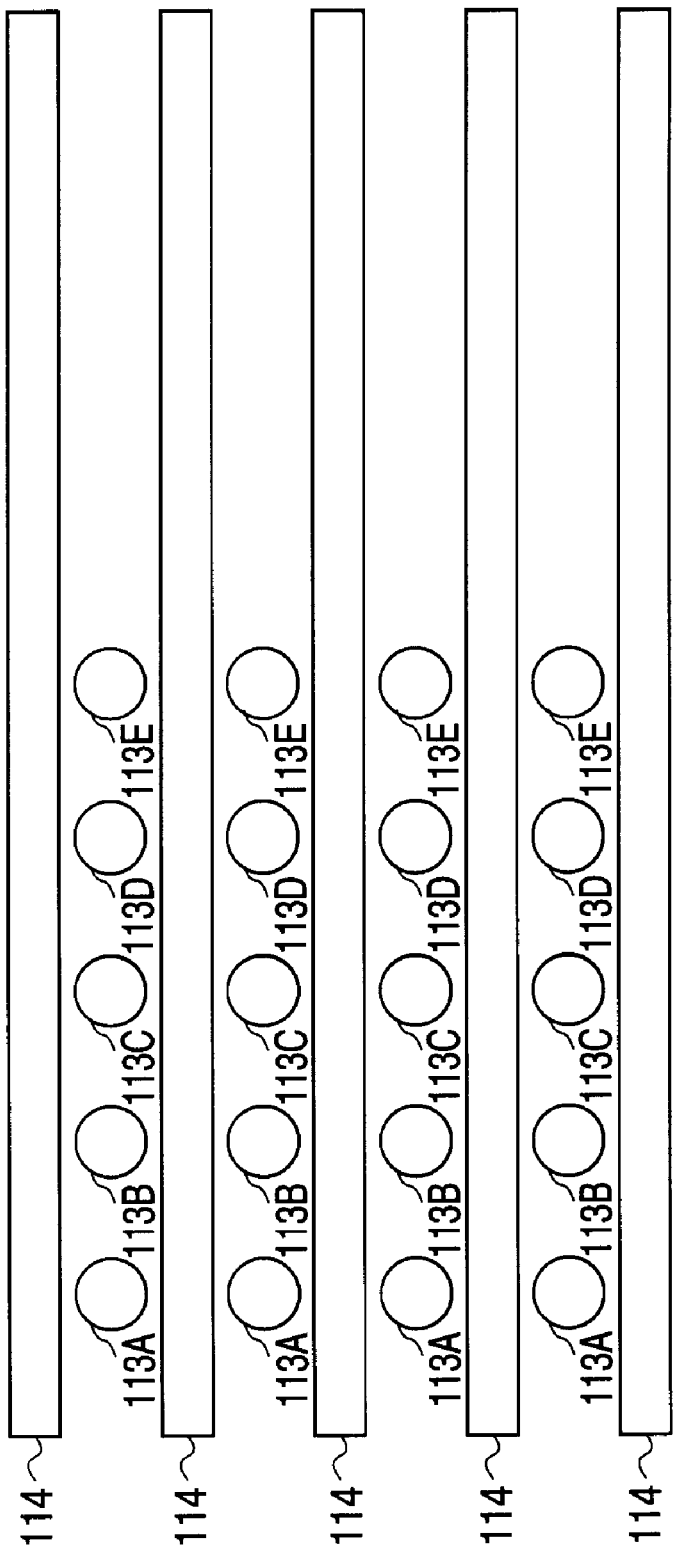
FIG. 10 is a plan view of the workpiece pickup apparatus according to the second exemplary embodiment.

FIG. 10 is a plan view of the workpiece pickup apparatus 100 according to the second exemplary embodiment.

FIG. 10 is the plan view of the workpiece pickup apparatus 100 as viewed from above, which shows pluralities of vacuum cups 113A to 113E are disposed individually between a plurality of (five according to the second exemplary embodiment) MGT belts 114. The number of vacuum cups 113 that are disposed between any two adjacent MGT belts 114 is five. In FIG. 10, the servo cylinders 111A to 111E, the support shafts 112, the workpieces 15 and the table 16 are omitted.

Figure 11:
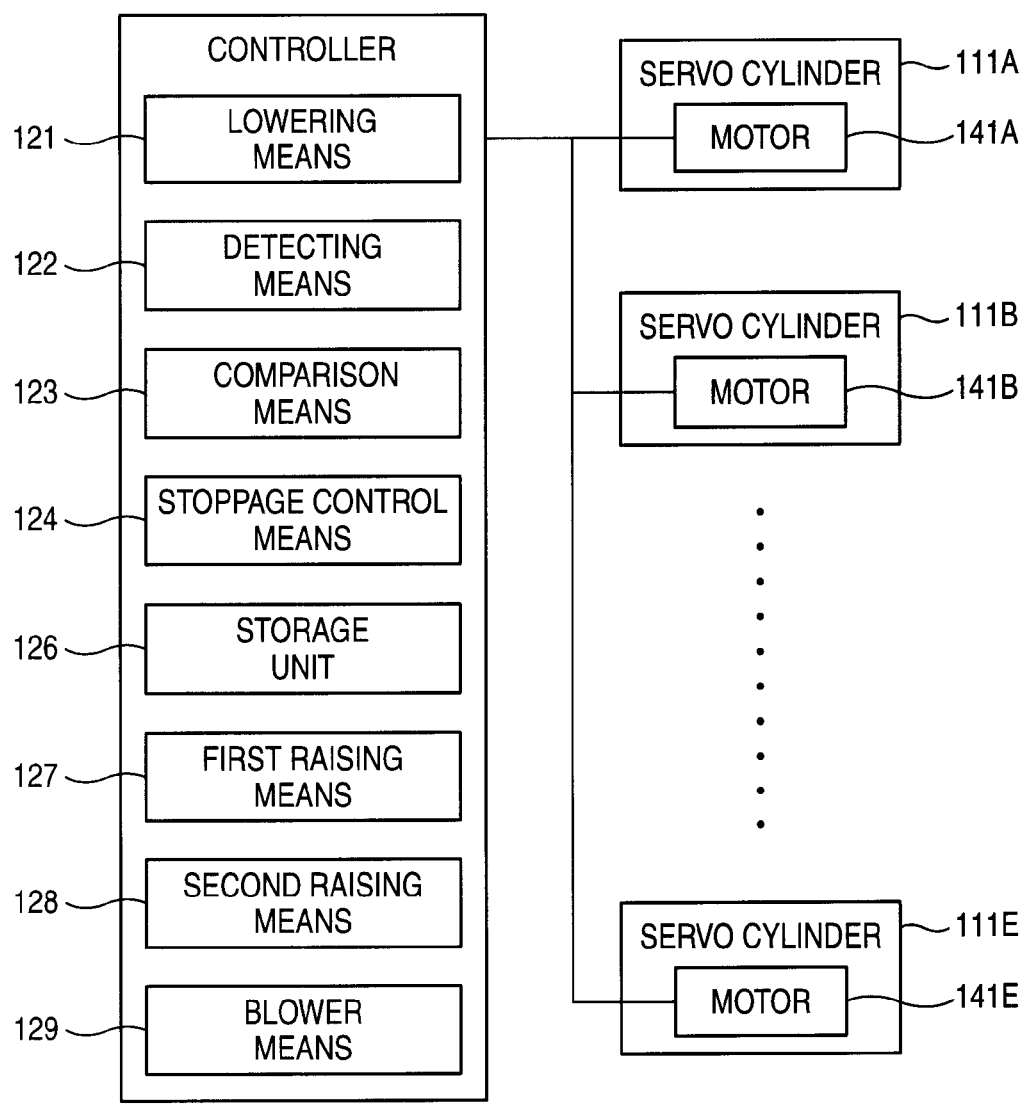
FIG. 11 is a block diagram showing a relationship between a controller and servo cylinders which are provided in the workpiece pickup apparatus according to the second exemplary embodiment.

FIG. 11 is a block diagram showing a relationship between the controller and the servo cylinders 111A to 111E which are provided in the workpiece pickup apparatus 100.

The servo cylinders 111A to 111E includes motors 141A to 141E, respectively, and are electrically connected with the controller via each of the motors 141A to 141E. The motors 141A to 141E receive a drive control signal from the controller to position the corresponding servo cylinders 111A to 111E in various locations or lower, raise and stop the servo cylinders 111A to 111E. The corresponding support shafts 112A to 112E and vacuum cups 113A to 113E follow the various movements of the servo cylinders 111A to 111E and are lowered as the servo cylinders 111A to 111E are lowered, for example.

The controller includes a lowering means (lowering unit) 121, a detecting means (detecting unit) 122, a comparison means (comparison unit) 123, a stoppage control means (stoppage control unit) 124, a laser measuring unit 125, a storage unit 126, a first raising means (first raising unit) 127, a second raising means (second raising unit) 128 and a blower means (blower unit) 129.

The lowering means 121 transmits, to the motors 141A to 141E, a drive control signal to lower the servo cylinders 111A to 111E. The detecting means 122 detects physical amounts corresponding to forces with which the vacuum cups 113A to 113E press the workpiece 15 (in the second exemplary embodiment, current values of currents which flow to the servo cylinders 111A to 111E).

The comparison means 123 compares the current values detected by the detecting means 122 and a reference current value. The reference current value is a suction force which is required individually for the vacuum cups 113A to 113E to suck up the workpiece 15 (hereinafter, referred to as a "required suction force") and is a current value which corresponds to forces with which the vacuum cups 113A to 113E individually press the workpiece 15. The reference current value is stored in advance in the storage unit 126.

The stoppage control means 24 stops the lowering of the individual servo cylinders 111A to 111E when current values of currents which flow individually to the servo cylinders 111A to 111E have reached the reference current value.

The first raising means 127 raises the servo cylinder 111A a given distance after the vacuum cups 113A, 113B, which were lowered first and second, respectively, have sucked the workpiece 15 with the required sucking force.

The second raising means 128 raises the servo cylinders 111A to 111E towards the waiting position after the vacuum cup 113E, which is lowered last, has sucked the workpiece 15 with the required sucking force. The blower means 129 blows air into the gap between the adjacent workpieces 15 on condition that the first raising means 127 has raised the servo cylinder 111A.

Figure 12:
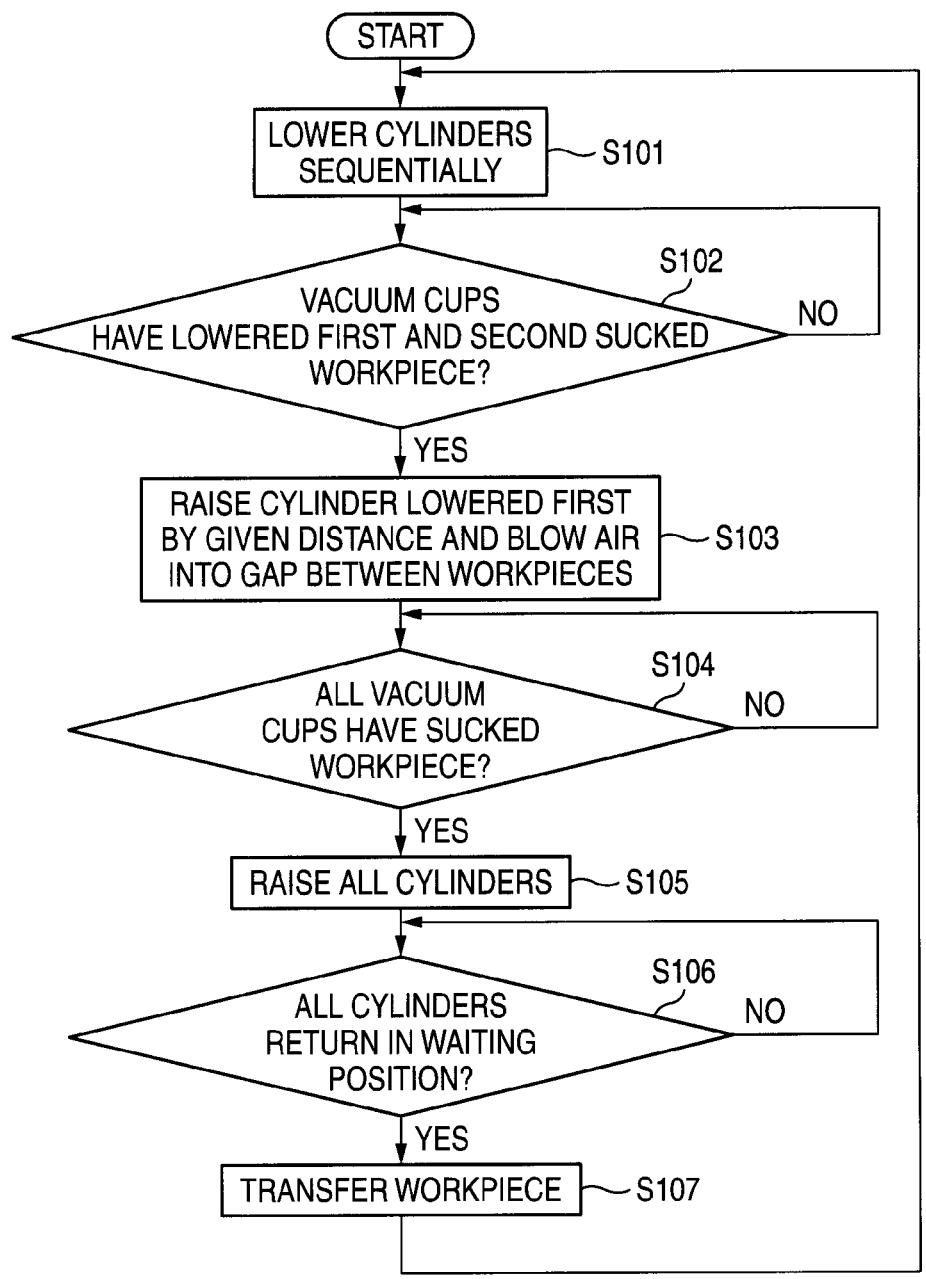
FIG. 12 is a flow chart showing operations carried out by the controller in lowering or raising the servo cylinders.

FIG. 12 is a flow chart showing operations carried out by the controller to lower, raise and stop the servo cylinders 111A to 111E.

In step S101, the servo cylinders 111A to 111E are lowered sequentially, starting from the servo cylinder 111A. As the servo cylinders 111A to 111E are lowered, the support shafts 112A to 112E and vacuum cups 113A to 113E are also lowered.

Figure 13:
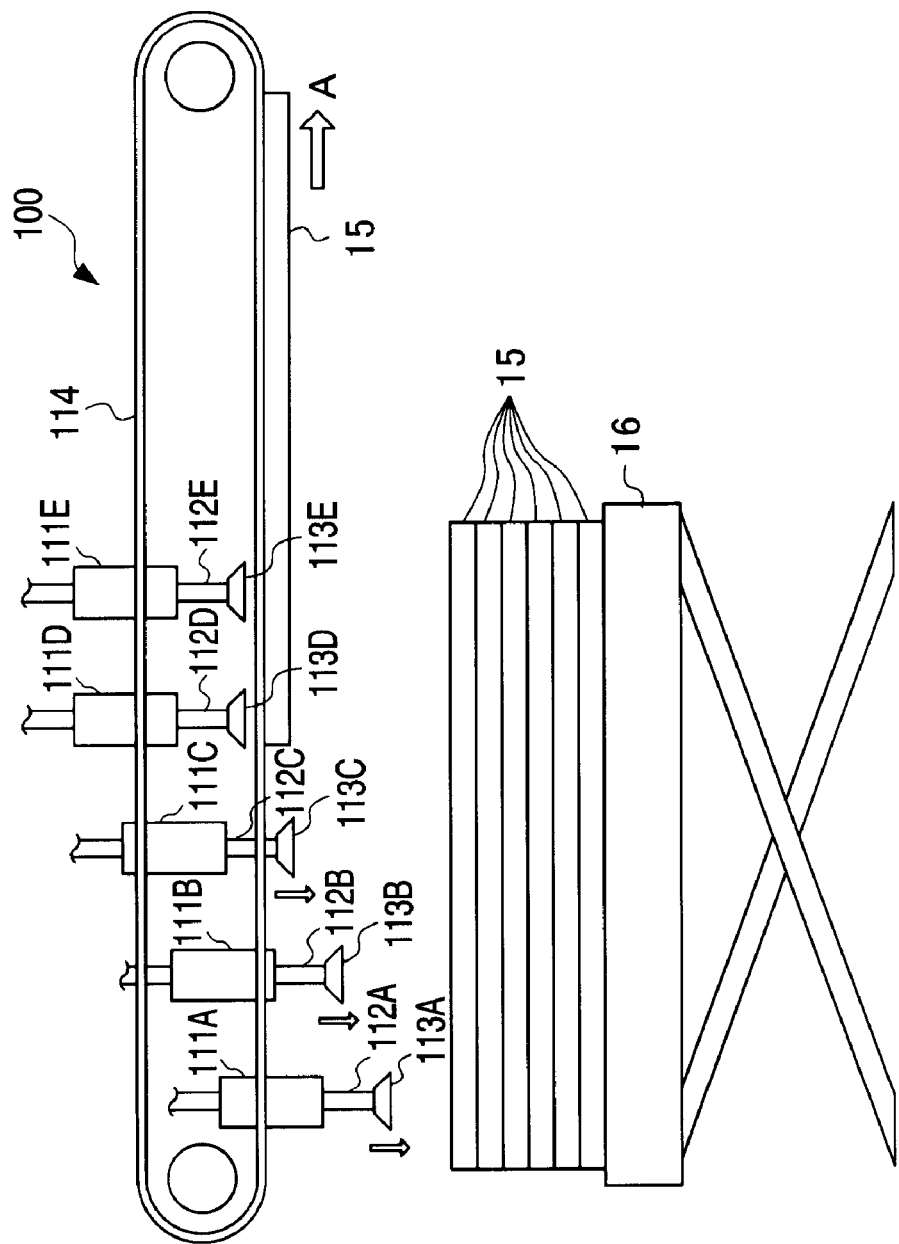
FIG. 13 is a diagram showing the servo cylinders as being started to be lowered from a waiting position.

Referring to FIG. 13, how the servo cylinders 111A to 111E are started to be lowered from the waiting position will be described.

According to FIG. 13, the workpiece 15 is being transferred in the transfer direction A, and starting from the servo cylinder 111A which is positioned at the endmost portion in the opposite direction to the transfer direction A, the servo cylinders 111A, 111B, 111C are being lowered sequentially from the waiting position.

On the other hand, the servo cylinders 111D, 111E are staying in the waiting position. Although the workpiece 15 which is being transferred does not exist in a direction in which the vacuum cups 113A to 113C are lowered, the workpiece 15 is still staying in the direction in which the vacuum cups 113D, 113E are being lowered. A condition for the individual servo cylinders 111A to 111E being started to be lowered is the passage of the workpiece 15 which is being transferred by points lying directly below the servo cylinders 111A to 111E in a direction in which the servo cylinders are lowered.

In this way, the lowering means 121 lowers sequentially the servo cylinders 111A to 111E on condition that the workpiece 15 which is being transferred has passed by the points which lie directly below the servo cylinders 111A to 111E in the direction in which the servo cylinders are lowered.

The controller includes a measuring unit (not shown) for measuring a traveling distance of the workpiece 15 in the transfer direction to determine that the workpiece 15 which is being transferred has passed by the points which lie directly below the servo cylinders 111A to 111E in the direction in which the servo cylinders are lowered. As an example of a measuring method of the traveling distance, a multiplication of driving speed and driving time is taken by measuring a driving time with the driving speed of the MGT belt 114 made constant.

The servo cylinders 111A to 111E may be lowered while accelerating the servo cylinders 111A to 111E from the waiting position to a point lying halfway down a passage to the topmost workpiece 15 (for example, halfway a distance from the waiting position to the topmost workpiece 15) and then decelerating the servo cylinders 111A to 111E.

By adopting this configuration, the cycle time can be reduced further, and it is possible to an impact generated when the vacuum cups 113A to 113E come down to contact and suck the workpiece 15.

Returning to FIG. 12, in step S102, it is determined whether or not the vacuum cups 113A, 113B, which were lowered first and second, respectively, have sucked the workpiece 15 with the required sucking force. Specifically, it is determined whether or not current values of currents which flow to the servo cylinders 111A, 111B both have reached the reference current value. In the case of YES, an operation in step S103 is performed, while in the case of NO, the operation in step S102 is performed.

In step S103, the servo cylinder 111A, which was lowered first, is raised a given distance, and air is blown into a gap between the topmost workpiece 15 and a second topmost workpiece 15 located just under the topmost workpiece 15.

Figure 14:
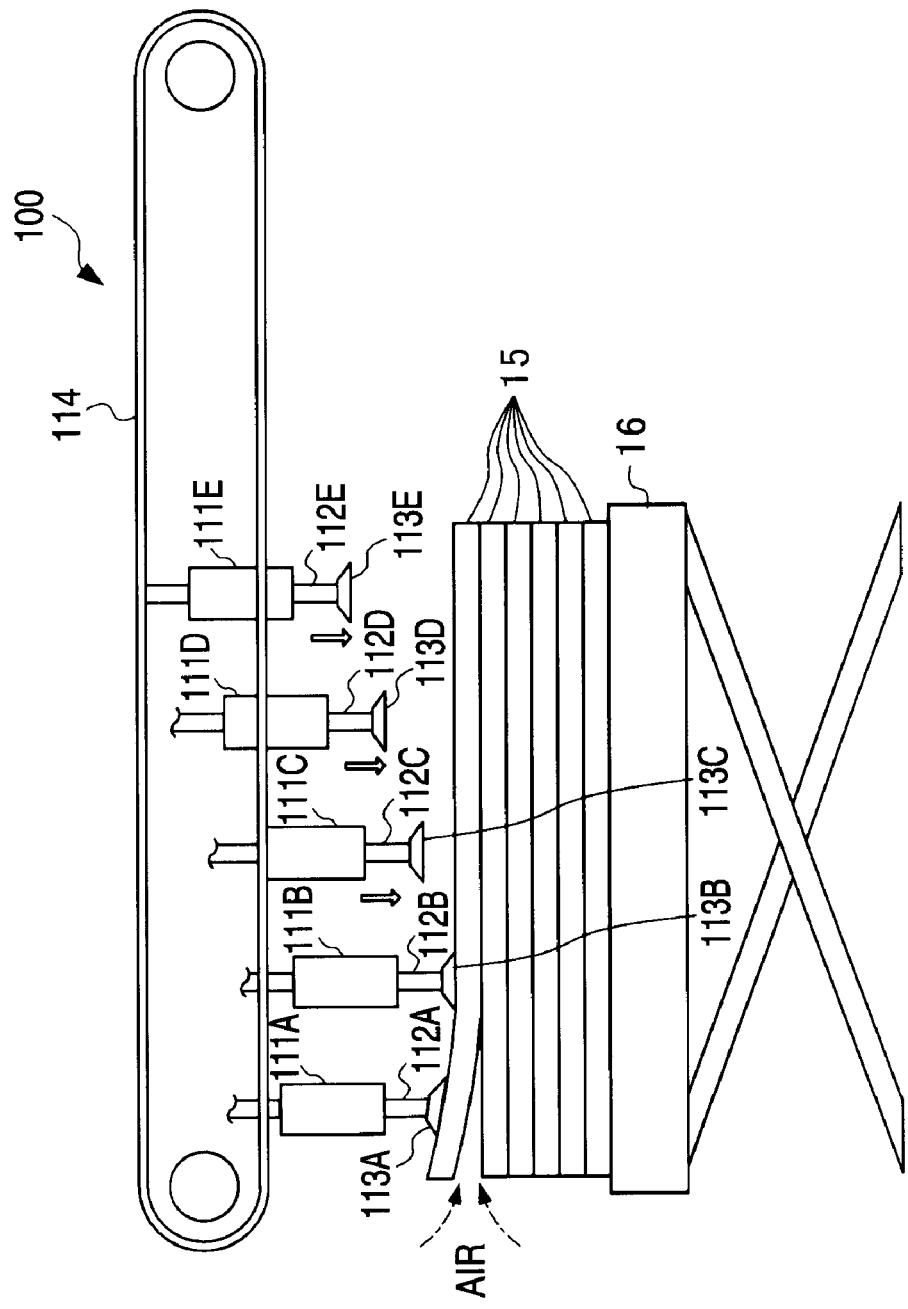
FIG. 14 is a diagram showing a state in which air is blown into a gap between workpieces which is produced after the servo cylinder has been raised a predetermined distance.

Referring to FIG. 14, how the servo cylinder 111A is raised the given distance while air is blown into the gap between the topmost workpiece 15 and the second topmost workpiece 15 will be described.

According to FIG. 14, the servo cylinder 111A has been raised the given distance, and air is being blown into the gap produced by an end portion of the topmost workpiece 15 being separated from the second topmost workpiece 15 by the blower means. Although the vacuum cups 113A, 113B are sucking the workpiece 15, the vacuum cups 113C to 113E are being lowered and do not suck the workpiece 15.

Blowing air into the gap by the blower means is triggered by the fact that the current values of the currents which flow to the servo cylinders 111A, 111B have reached the reference current value. Namely, the blowing of air is triggered by the fact that the vacuum cups 113A, 113B suck the workpiece 15 with the required sucking force.

Returning to FIG. 12, in step S104, it is determined whether or not all the vacuum cups 113A to 113E have sucked the workpiece 15 with the required sucking force. Specifically, it is determined whether or not all the current values of the currents which flow to the servo cylinders 111A to 111E have reached the reference current value. In the case of YES, an operation in step S105 is performed, while in the case of NO, the operation in step S104 is operated.

Figure 15:
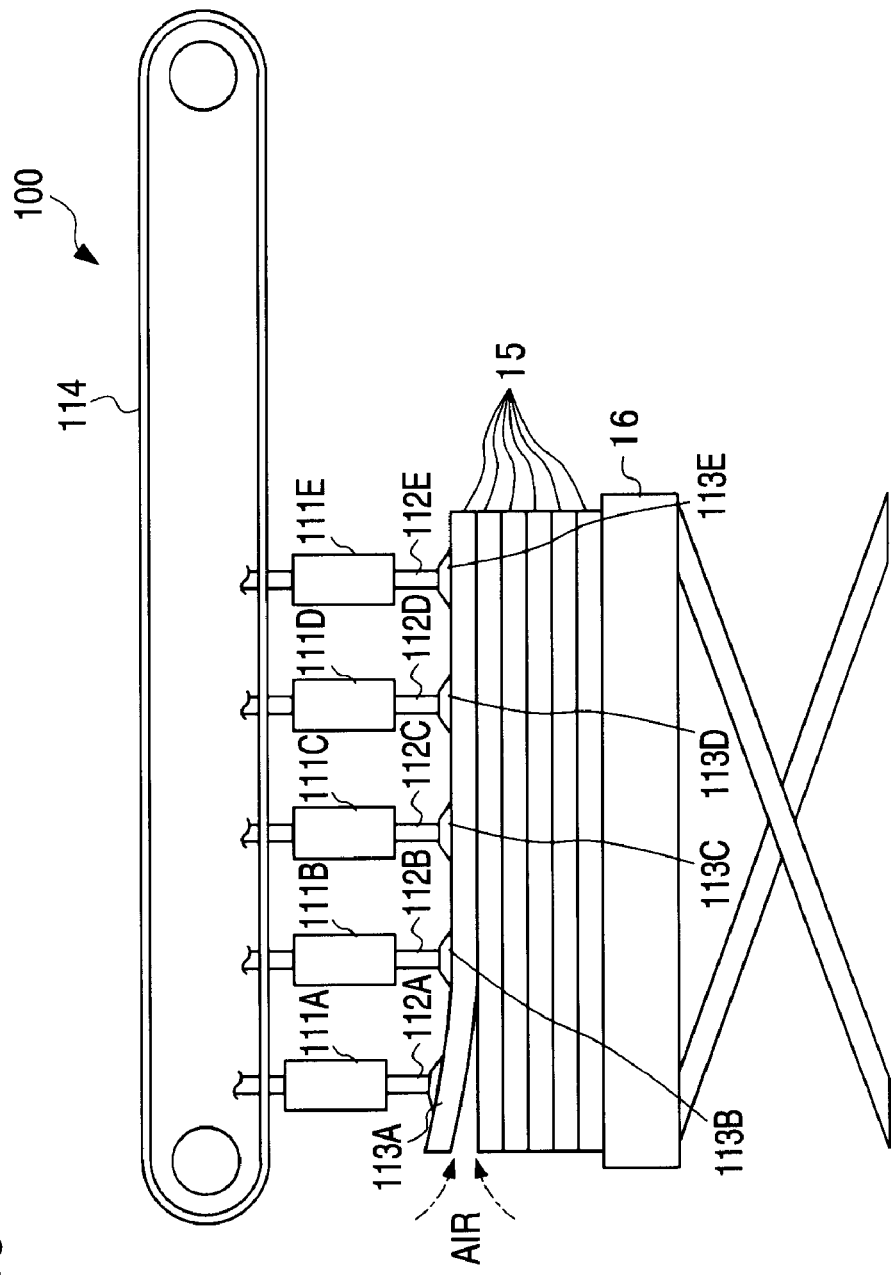
FIG. 15 is a diagram showing all vacuum cups as sucking a workpiece.

Referring to FIG. 15, how all the vacuum cups 113A to 113E suck the workpiece 15 with the required sucking force will be described.

According to FIG. 15, all the vacuum cups 113A to 113E are sucking the workpiece 15 with the required sucking force, and the vacuum cup 113A has already been raised a given distance. Consequently, since the vacuum cup 113A does not have to be raised after the vacuum cup 113E which has been lowered last sucks the workpiece 15 with the required sucking force, the vacuum cup 113E can be raised immediately after the vacuum cup 113E has sucked the workpiece 15 with the required sucking force. Consequently, it is possible to eliminate a wasteful waiting time from the time when the vacuum cup 113E has started to suck the workpiece 15 with the required sucking force to the time when the vacuum cup 113E is raised, thereby making it possible to reduce a cycle time of picking up the workpieces 15.

The first raising means 127 may continue to raise the vacuum cup 113A without reducing the raising speed to 0 after raising the vacuum cup 113A the given distance. By doing so, it is unnecessary to generate a larger acceleration, which would have to be generated to start raising the vacuum cup 113A again after the rising speed has been reduced to 0, thereby making it possible to reduce a control load of the controller in controlling the raising of the vacuum cup 113A.

Returning to FIG. 12, in step S105, all the servo cylinders 111A to 111E are raised. How the servo cylinders 111A to 111E are raised will be illustrated in FIG. 16.

Figure 16:
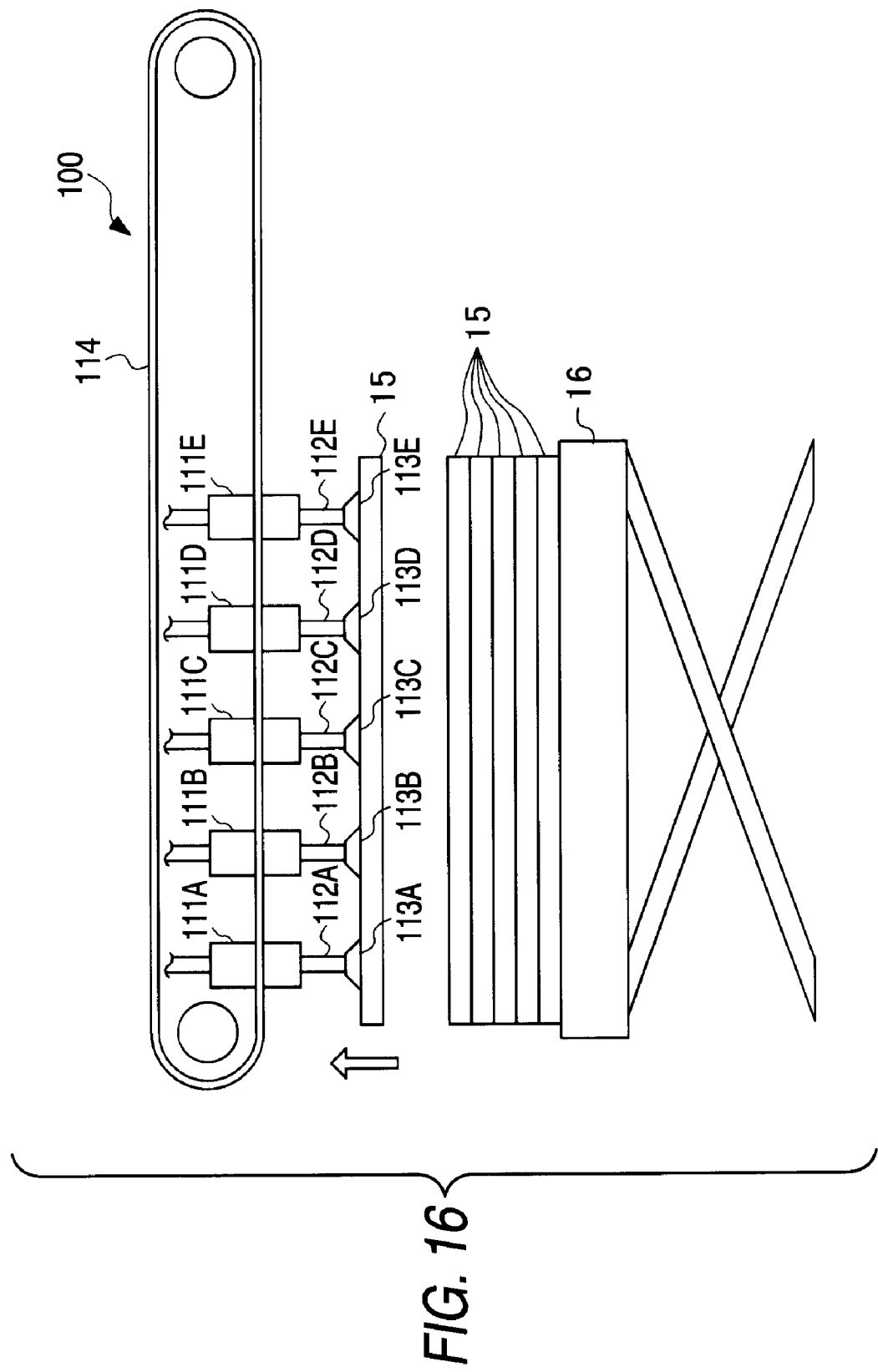
FIG. 16 is a diagram showing the servo cylinders as being raised.

FIG. 16 is a diagram showing the servo cylinders 111A to 111E which are in the midst of being raised. According to FIG. 16, the vacuum cups 113A to 113E suck the workpiece 15, so as to raise only the topmost workpiece 15.

Returning to FIG. 12, in step S106, it is determined whether or not all the servo cylinders 111A to 111E return to the waiting position. In the case of YES, an operation in step S107 is performed, while in the case of NO, the operation in step S106 is performed.

In step S107, the workpiece 15 is transferred, and the operation in step S101 is performed during the transfer of the workpiece 15. How this operation is performed will be described by reference to FIG. 17.

Figure 17:
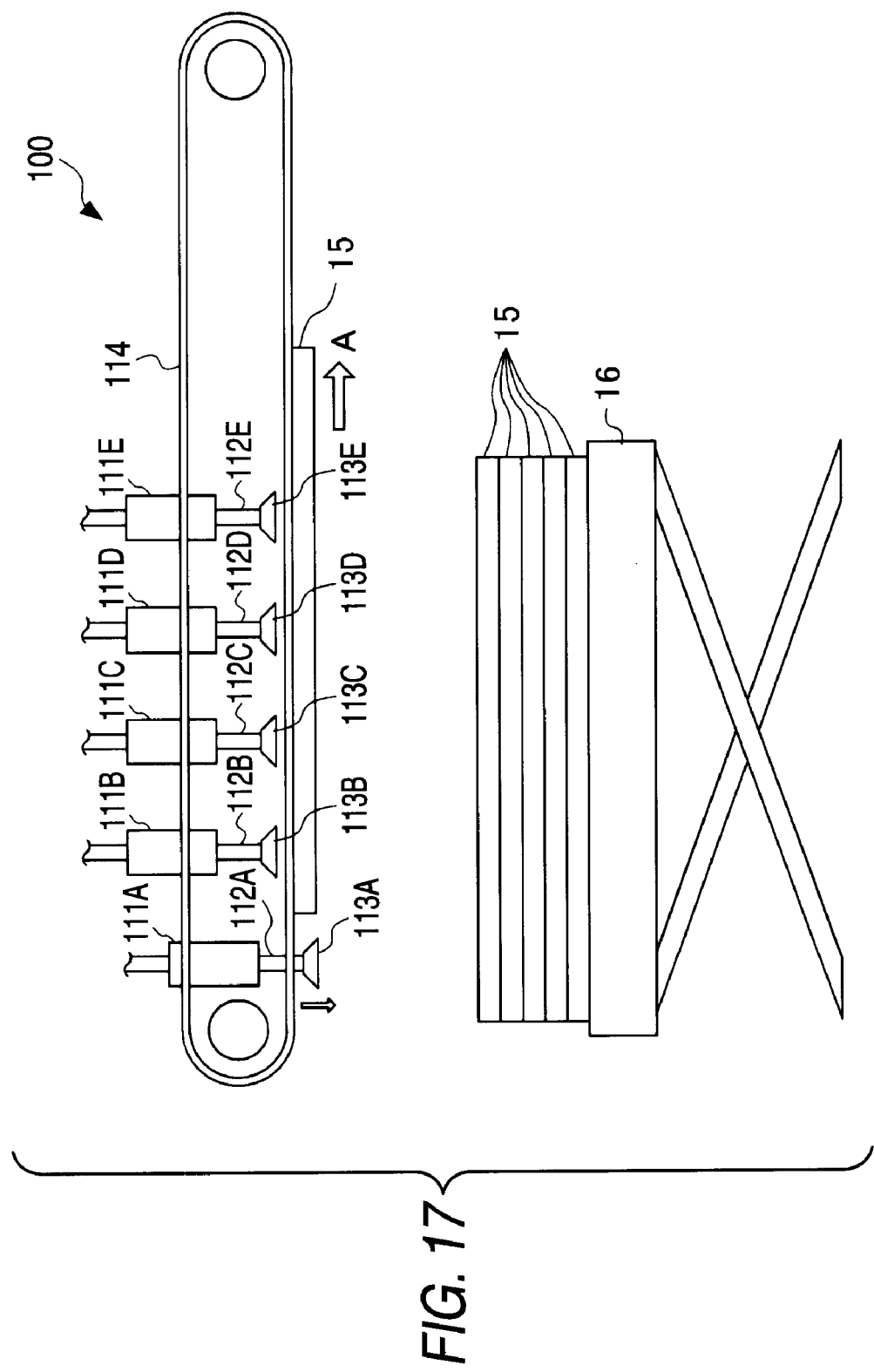
FIG. 17 is a diagram showing the workpiece as being transferred after the servo cylinders have returned to the waiting position.

FIG. 17 is a diagram illustrating how the workpiece 15 is transferred after the servo cylinders 111A to 111E have returned to the waiting position. According to FIG. 17, the workpiece 15 is magnetically attracts to the MGT belt 114 and is transferred in a direction indicated by an arrow A in FIG. 17. The workpiece 15 which is being transferred has passed by below the vacuum cup 113A, and the servo cylinder 111A has started to be lowered.

Thereafter, by performing the series of operations shown in FIG. 12 repeatedly, the workpieces 15 can be transferred.

According to the second exemplary embodiment, the following advantages can be obtained.

(1) In the workpiece pickup apparatus 100, at least the vacuum cups 113A, 113B are lowered first and second, respectively, to suck the topmost workpiece 15 with the required sucking force, then at least the vacuum cup 113A is raised the given distance before the vacuum cup 113E, which is lowered last, sucks the topmost workpiece 15 with the required sucking force, and all the vacuum cups 113A to 113E are raised towards the waiting position immediately after the vacuum cup 113E sucks the topmost workpiece 15 with the required sucking force.

Consequently, since it is possible to eliminate the wasteful waiting time produced from the time when the vacuum cup 113E starts to suck the workpiece 15 to the time when the vacuum cup 113E is raised, the cycle time can be reduced.

The lowering means 121 lowers the vacuum cups 113A to 113E sequentially while the workpiece 15 is being transferred. Namely, since the vacuum cups 113A to 113E are lowered without waiting for the completion of transfer of the workpiece 15, it is possible to eliminate a wasteful waiting time produced until the completion of transfer of the workpiece 15. The cycle time can also be reduced.

Further, the first raising means 127 raises at least the vacuum cup 113A after the vacuum cups 113A, 113B suck the workpiece 15 with the required sucking force and before the vacuum cup 113E starts to suck the workpiece 15 with the required sucking force.

Consequently, since the topmost workpiece 15 can be separated from the second topmost workpiece 15 from the end portions of the workpieces 15, the occurrence of the double blank can be prevented without providing a magnet floater for defining gaps between the workpieces 15.

(2) Since the blower means can blow air the gap between the topmost workpiece 15 and the second topmost workpiece 15 on condition that at least the vacuum cup 113A is raised by the first raising means 127, that is, the vacuum cups 113A, 113B suck the topmost workpiece 15 with the required sucking force, the prevention of the double blank can be strengthened.

The invention is not limited to the second exemplary embodiment, and it should be understood that modifications and improvements which fall within a scope where the object of the invention can attain are included in the invention.

What is claimed is:

1. A workpiece pickup apparatus comprising:
   a gripping unit that sucks a workpiece so as to lift up the workpiece and releasably attach the workpiece to the gripping unit;
   a raising and lowering unit that lowers the gripping unit from a waiting position towards the workpiece and that raises the gripping unit and workpiece;
   a detecting unit that detects a current flowing to the raising and lowering unit, said current corresponding to a force with which the gripping unit is pressed against the workpiece by the raising and lowering unit;
   a comparison unit that compares the detected current with a reference current and provides a comparison result; and
   a controller that controls a movement of the gripping unit in the direction toward the workpiece based on the comparison result, wherein
   the controller lowers the gripping unit until the detected current reaches the reference current, and the controller stops the raising and lower unit from further lowering the gripping unit when the detected current reaches the reference current; and
   the detecting unit begins to detect the current after the gripping unit is lowered a given distance from a position in which the gripping unit contacts the workpiece.

2. A workpiece pickup method comprising the steps of:
   providing a gripping unit that sucks a workpiece to lift up the workpiece and releasably attach the workpiece to the gripping unit;
   providing a raising and lowering unit that is operable to raise and lower the gripping unit;
   operating the raising and lowering unit so as to lower the gripping unit from a waiting position toward the workpiece;

detecting a current flowing to the raising and lowering unit, said current corresponding to a force with which the gripping unit is pressed against the workpiece by the raising and lowering unit;

comparing the detected current with a reference current to obtain a comparison result;

controlling operation of the raising and lowering unit and associated movement of the gripping unit in the direction toward the workpiece based on the comparison result;

operating the raising and lowering unit to lower the gripping unit until the detected current reaches the reference current, after the detected current reaches the reference current, stopping operation of the raising and lowering unit, and initiating detection of the current after the gripping unit is within a given distance from the workpiece.

3. A workpiece pickup apparatus comprising:

a transferring unit which transfers a workpiece in a transferring direction;

a plurality of gripping units which suck the workpiece so as to lift up the workpiece and which are arranged in a line along the transferring direction, the plurality of gripping units including at least a first gripping unit located at an endmost portion in an opposite direction to the transferring direction, a second gripping unit located at a side of the first gripping unit in the transferring direction and a third gripping unit located at a side of the second gripping unit in the transferring direction;

a lowering unit which lowers the first to third gripping units in order from a waiting position towards the workpiece during a transfer of the workpiece by the transferring unit;

a first raising unit which raises at least the first gripping unit for a given distance after at least the first and second gripping units start to suck the workpiece and before the third gripping unit starts to suck the workpiece; and a second raising unit which raises all the plurality of gripping units towards the waiting position immediately after the third gripping unit starts to suck the workpiece.

4. The workpiece pickup apparatus according to claim 3 further comprising:

a blower unit which blows air into a gap between a topmost workpiece and a second topmost workpiece, wherein the blower unit starts to blow air into the gap on condition that at least the first gripping unit which is lowered first is raised by the first raising unit.

* * * * *